March 22, 1966  M. F. NESMITH  3,241,736
CIRCUMFERENTIAL WELDER

Filed Nov. 25, 1964  3 Sheets-Sheet 1

Malcolm F. NeSmith,
INVENTOR.

BY
ATTORNEYS

March 22, 1966  M. F. NESMITH  3,241,736
CIRCUMFERENTIAL WELDER

Filed Nov. 25, 1964  3 Sheets-Sheet 2

Malcolm F. NeSmith,
INVENTOR.

Malcolm F. NeSmith,
INVENTOR.

United States Patent Office 3,241,736
Patented Mar. 22, 1966

3,241,736
CIRCUMFERENTIAL WELDER
Malcolm F. Nesmith, Wichita, Kans., assignor to the United States of America as represented by the Secretary of the Army
Filed Nov. 25, 1964, Ser. No. 414,031
14 Claims. (Cl. 228—44)

The invention described herein may be manufactured and used by or for the Government for governmental purposes without the payment of any royalty thereon.

My invention relates to apparatus for joining thin, flexible tubular members of metal in butt relation along their circumferences and more specifically to apparatus for properly positioning and conditioning such tubular members preparatory to and during butt welding of such members.

Conventional apparatus is adequate for joining relatively thick metal tubular members since such members are relatively rigid and the heat of the welding electrode is sufficiently dissipated by the members to prevent undue deformation of such members. However, with the thin, flexible metallic tubular members that the invention is concerned with, deformation and buckling are a substantial problem since it is very important to have a precise and exact abutment of the two members to be joined. This is especially important when the tubular members are to make up sections of space craft because of the necessity for uniformity. Attempts have been made to provide internal support for such tubular members but such supports have required precise engineering for each diameter of the tubular members to be joined and yet still fail to adequately dissipate the heat generated by the welding process. Furthermore, it is sometimes necessary or desirable to preheat or condition the tubular members before commencing to join them. The prior art makes no provision for such conditioning of tubular members whereas the instant invention has this capability.

It is therefore an object of this invention, to provide an apparatus for properly positioning and supporting metallic tubular members in butt relation for joining along a circumferential connection line.

Another object of the invention is to provide such apparatus with fluid-conditioned rolls in contact with the tubular members to support and also to regulate the temperature of the abutting tubular members both preparatory and during the joining operation, per se.

The invention compises generally means for internally supporting flexible metal tubular members of varying lengths and diameters. It includes means for revolving the members past a welding electrode and more particularly provides internal and external means for accurately supporting the members in precise abutment as they revolve past the electrode.

The foregoing and other objects of this invention will become more apparent from the following detailed description and the accompanying drawing in which.

Figure 1:
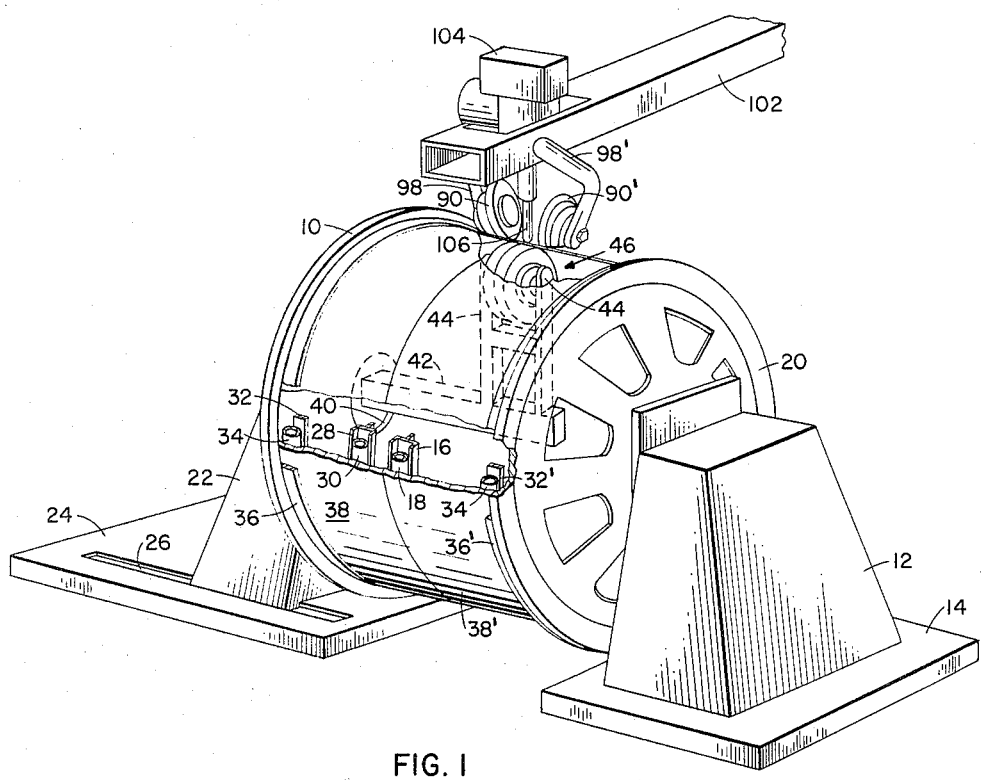
FIGURE 1 is a perspective view of the invention in use with portions cut away for clarity.

In the drawings like reference characters are used to designate the same elements throughout. Referring now particularly to FIGURE 1 which shows the entire structure of the apparatus during its use to unite, by welding, a pair of flexible, tubular, metallic members 38 and 38'. The apparatus includes a pair of spiders or chucks 10 and 20 having members 38 and 38' supported therebetween in abutting relation. To secure member 38 to spider 10, an internal support ring 32, having an inflatable tube 34 thereabout is carried adjacent spider 10 for coaction with an external clamping ring 36, mounted externally of member 38 adjacent spider 10. Tube 34 is disposed for inflation to clamp member 38 to ring 36. Member 38' is secured to spider 20 by means of an internal support ring 32', having an inflatable tube 34' therein. Support ring 32' is carried adjacent spider 20 for coaction with an external clamping ring 36' mounted externally of member 38' adjacent spider 20. Tube 34' is disposed for inflation to clamp member 38' to ring 36'. In addition to the above support, contour rings 16 and 28 are disposed internally of said members. These rings carry inflatable tubes 18 and 30 respectively to support the inner ends of the tubular members to insure the proper contour of said members.

To provide revolution of members 38, 36' during the welding operation, spider 20 is rotatably mounted in an axially fixed headstock 12 mounted on a base plate 14 which contains a drive means (not shown) for rotating the spider. Spider 10 is similarly mounted in a headstock 22 which is mounted in slots 26 on a base plate 24 so as to be axially adjustable towards and away from headstock 12 for ease in mounting the tubular members and to provide an adjustment for receiving members of different lengths. Headstock 22 also contains means for driving spider 10 in synchronous with spider 20. This drive can be accomplished by individual motors or by the proper gearing from a central drive for both spiders, as desired, in a manner well known in the art.

Figure 2:
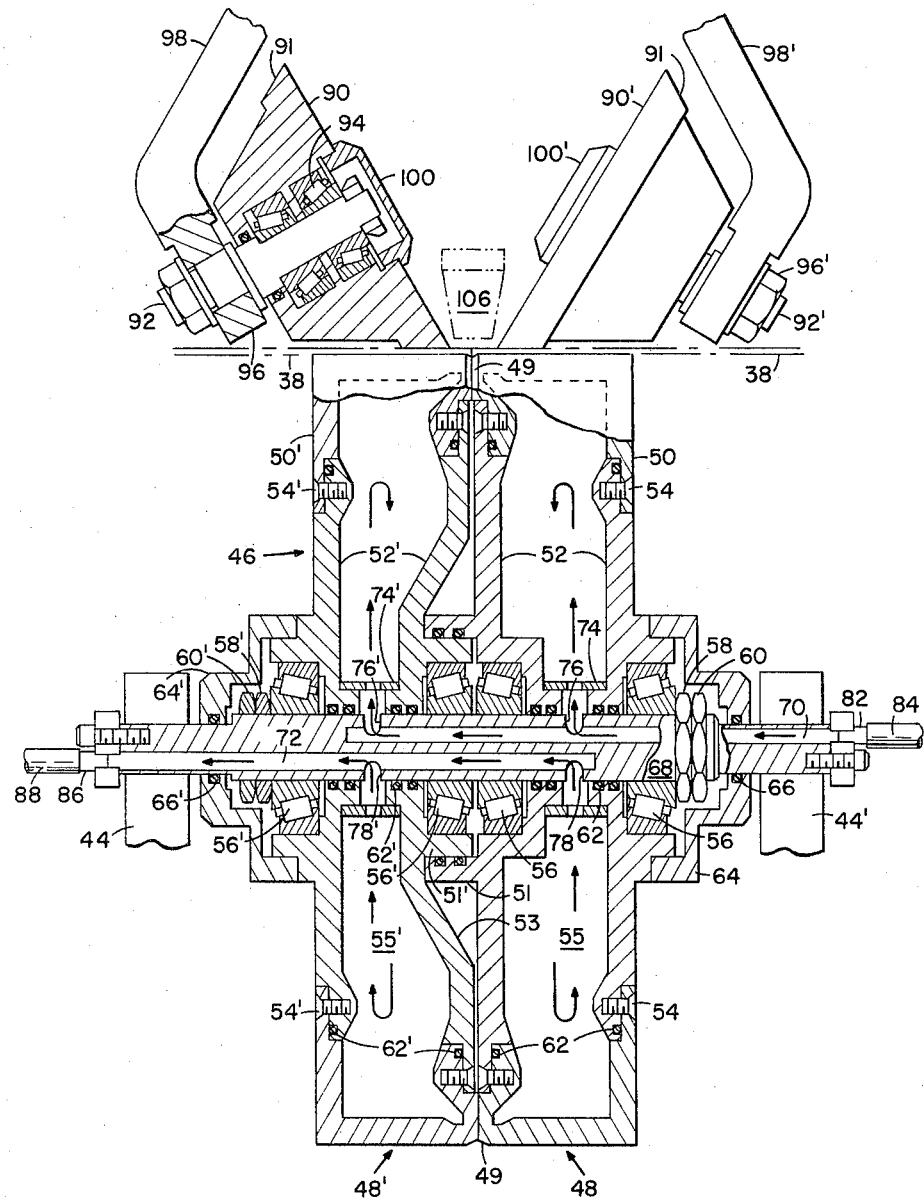
FIGURE 2 is a detailed view of the weld-backing roll and the hold-down rolls with some parts in section in order that their internal structure may be shown.

Headstock 22 is also provided with an opening 40 for a supporting frame 42 which is supported in headstock 22 and has two vertical arms 44, 44' adapted to support a weld-backing roll 46 at the point of abutment between the tubular members. This roll further supports the tubular members at a point opposite a welding electrode 106 and insures a precise abutment of the members. Roll 46 consists of a first cylindrical portion 48 with a second cylindrical portion 48' nesting or mating with the first portion as can be seen in FIGURE 2. Each of the said portions are rotatably mounted on an axle 68 supported by arms 44 and 44'. The first cylindrical portion 48 comprises a rim portion 50 and a hub portion 52 held together by assembly screws 54. When assembled, the rim and hub form the first cylindrical portion with an internal cavity 55 for reception of a conditioning fluid for reasons explained subsequently in detail.

The second cylindrical portion is constructed in substantially the same manner as the first cylindrical portion in that it comprises a rim portion 50' and a hub 52' held together by assembly screws 54'. However, hub portions 52 and 52' differ slightly in shape. Hub 52 is provided with an annular neck 51 which extends into an offset portion 53 of hub 52' to enclose an annular neck 51' projecting from hub 52'. Thus, as shown in FIGURE 2 the hubs are formed to provide a substantially uniform roll surface to the weld-backing roll and still provide individual conditioning of the surface of each cylindrical portion and thereby the individual conditioning of the area of each of the tubular members adjacent the juncture or weld line. Note also, that the inner edges of both portions have a slight bevel to provide a groove 49 for the head formed by the welding.

To permit the fluid to enter and exhaust from cylinders 48 and 48', axle 68, which supports the weld-backing roll as noted above, is provided with a fluid supply passage 70 and a fluid exhaust passage 72. The supply passage has supply ports 76, 76' communicating with cavities 55, 55' through perforated plates 74, 74' and openings 80, 80' in the base of the hub adjacent the axle. The exhaust passage is provided with exhaust ports 78, 78' which also communicate with cavities 55, 55' through the opening in the hub and the perforated plate to exhaust the fluid from the cavities. Conditioning fluid, which may be either hot or cold, depending on whether the tubular members must be preheated before welding begins or the heat generated by welding must be dissipated to prevent the tubular members from becoming overheated, is supplied from a source not shown through a supply line 84 to an inlet port 28 under pressure. The pressure of the fluid forces the fluid into the cavities and circulates it through the cavities and out the exhaust ports as shown by the flow arrows in FIGURE 2. Fluid seals 62 are provided at the juncture between the rim portions and the hub portions and between the hub portions and the axle to prevent leakage of the conditioning fluid.

Clyindrical portions 48 and 48' of the weld-backing roll are individually mounted on roller bearings 56, 56', respectively, for free rotary movement on axle 68. Portions 48 and 48' are maintained in the proper position by position nuts 58, 58' and locking nuts 60, 60', both of which are threaded on axle 68. Grease cups 64, 64' are provided at the ends of the weld-backing roll to hold grease for the bearings and to prevent dust and the like from contaminating the bearings. These cups are also respectively provided with seals 66, 66'.

Extending over the juncture point of the tubular members and the weld-backing roll is a boom 102 which supports a welding head 104 as seen more clearly in FIGURE 1. This boom has an opening in the bottom portion thereof for a welding electrode 106. Depending from the boom are two support arms 98, 98', each of which supports a hold-down roll 90, 90', respectively in such a manner that the hold-down rolls press the tubular members into firm contact with the weld-backing roll when the electrode is in welding position. These rolls are very important in maintaining a precise uniform abutment between the tubular members during the welding thereof because they maintain the tubular members in continuous contact with the weld-backing roll. The construction of the hold-down rolls can be seen more readily in FIGURE 2 where roll 90 is shown in section. Hold-down rolls 90 and 90', are generally of a compound frusto-conical configuration and are respectively provided with contacting surfaces 91 and 91', the lower portions of which are substantially parallel with adjacent portions of cylindrical surfaces 48, 48'. These portions of the hold-down rolls and the adjacent portions of surfaces 48, 48' accurately clamp the ends of tubular members 38, 38'. The frusto-conical configuration is important because it permits the rolls to contact the tubular members at a point much closer to the juncture of the tubular members than would cylindrical rolls since the welding electrode must have access to the tubular members at their point of juncture. As shown in FIGURE 2 the hold-down rolls are mounted on intersecting axes so that the contact surface of the rolls can maintain the same degree of control over the tubular members as would be maintained by cylindrical rolls. These intersecting axes are obtained by bending or shaping arms 98, 98' to provide the desired axes as shown in FIGURES 1 and 2. Obviously, however, the desired angle could be obtained by other expedients such as providing horizontal branch arms from the boom, and arms 98, 98' could be welded or bolted thereto to provide the desired angle to the axes of the hold-down rolls.

Each of hold-down rolls 90 and 90' are respectively mounted for free rotation on axles 92 and 92' by means of roller bearings 94. Axles 92, 92' are respectively locked within an opening in each of the support arms by means of nuts 96, 96'. Grease cups 100, 100' are used to cover the free end of the axles to keep dust and the like out of the bearings.

Figure 3:
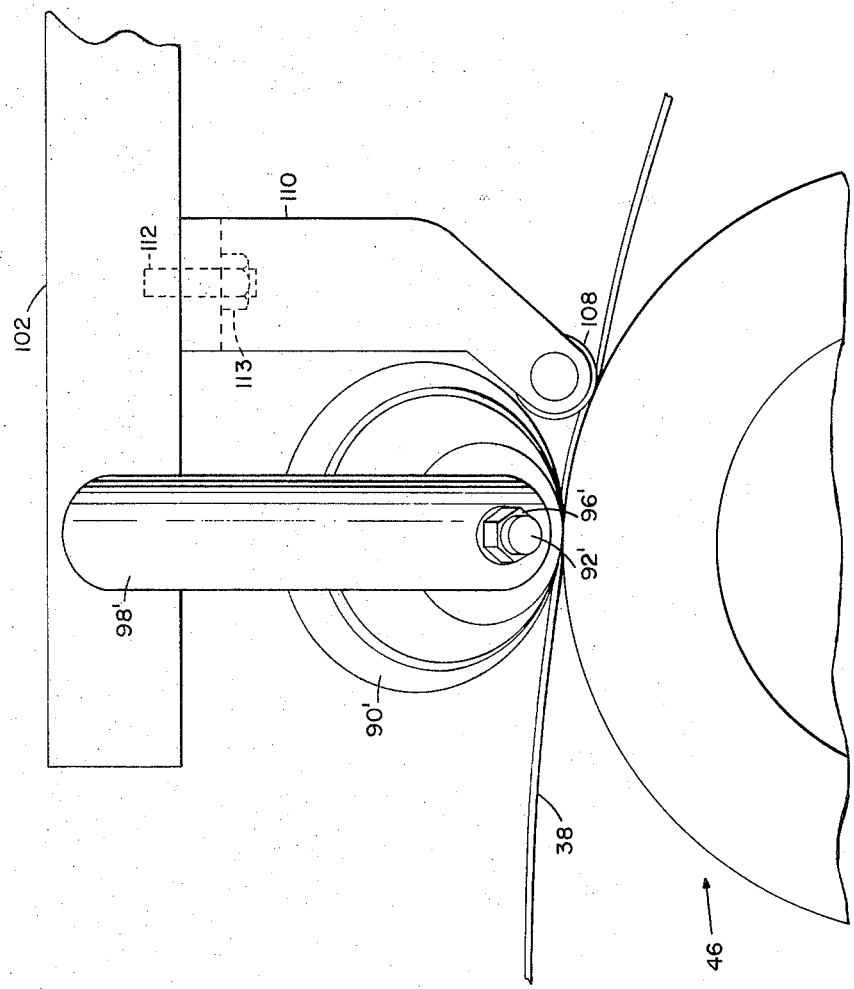
FIGURE 3 is an end view of a portion of the weld-backing roll and one of the hold-down rolls including an added deflecting roll.

An end view of a portion of the weld-backing roll and one of the holddown rolls in use is shown in FIGURE 3. This figure also shows an alternative supplemental deflecting roll 108 mounted on a generally U-shaped support arm bracket 110, which depends from the boom and is held thereto by a bolt 112 and nut 113. Roll 108 extends across the juncture between the tubular members and deflects the flexible tubular members into further contact with the weld-backing roll to provide a greater area of contact therebetween and a longer period of conditioning prior to the passage of the members past the welding electrode and the welding consequent therefrom. This roll is not necessary but is useful when the tubular members must be conditioned prior to the actual welding thereof.

As noted above the conditioning fluid may be maintained at a preselected temperature, i.e. either hot or cold depending upon the nature of the tubular members. In some instances it may be hot at the beginning to heat-condition the tubular members and cooled to maintain this temperature once the welding has been started to prevent overheating of the members. This fluid supply and the control of its flow is accomplished by means old in the art as well as obvious to those skilled in the fluid art, and therefore has not been illustrated since it is not critical; but water and oil are two fluids which have been found to be satisfactory for use in the invention.

The hold-down rolls, the weld-backing roll, and the deflecting roll, if used, should be formed of a heat resistant metal and of such a size as to provide the degree of contact and support necessary for the tubular members but must also avoid excessive weight, especially in the weld-backing roll. Copper, aluminum, and steel have been found well suited for the construction of these rolls.

It is to be understood that the form of the invention shown herein is merely exemplary of the invention and is not to be construed as limitive thereof since various changes as to shape, size, materials used, and the like, may be made without departing from the spirit of the invention or the scope of the subjoined claims.

I claim:

1. In a device for supporting a pair of flexible metal tubular members for welding a circumferential butt joint therebetween, an apparatus comprising:
    (a) internal support means including expendable support means for engaging the internal surfaces of the tubular members to support the tubular members and maintain the ends of the tubular members in abutting relation and a weld-backing roll disposed to support internally the abutting ends of the tubular members at the point where said members abut;
    (b) a first hold-down roll disposed for external contact with one of said members to hold said member in contact with said weld-backing roll adjacent the point where said members abut; and
    (c) a second-hold-down roll disposed for external contact with the other of said members to hold said member in contact with said weld-backing roll adjacent the point where said members abut; whereby said hold-down rolls exert a positive control over said members near their point of abutment while in contact with the weld-backing roll.

2. In a device as set forth in claim 1, wherein said hold-down rolls are substantially conical.

3. In a device as set forth in claim 1 wherein said weld-backing roll comprises:
    (a) a first cylindrical portion having an internal cavity therein adapted to receive a supply of conditioning fluid under pressure, said portion having a supply port and an exhaust port; and
    (b) a second cylindrical portion disposed in abutting relation with said first portion and operatively interconnected therewith so as to provide a composite, substantially uniform roll surface, said second portion having an internal cavity therein adapted to receive a supply of conditioning fluid under pressure, said second portion having a supply port and an exhaust port within its supporting axle.

4. In a device as set forth in claim 1 wherein said weld-backing roll and said hold-down rolls are disposed on roller bearings, whereby said rolls are in free, rolling contact with said tubular members.

5. In a device as set forth in claim 2, wherein said hold-down rolls are individually rotatably mounted on interesecting axes.

6. In a device as set forth in claim 3 wherein the conditioning fluid is a cooling fluid adapted to maintain the roll surface at a preselected temperature.

7. In a device as set forth in claim 3 wherein the conditioning fluid is a heating fluid adapted to maintain the roll surface at a preselected temperature.

8. In a device for securing a pair of flexible metal tubular members for welding a circumferential butt joint therebetween, comprising:
   (a) first support means for supporting one of said pair of tubular members;
   (b) second support means for supporting the other of said pair of tubular members in abutting, end-to-end contact with said one tubular member supported by said first support means;
   (c) a weld-backing roll rotatably disposed intermediate said first and second support means to support the abutting ends of said pair of tubular members from the interior of said tubular members;
   (d) a first hold-down roll rotatably disposed in a position adjacent said weld-backing roll external to one of said pair of tubular members and adapted to hold said one tubular member in contact with said weld-backing roll adjacent the point where said members abut; and
   (e) a second hold-down roll rotatably disposed in a position adjacent said weld-backing roll external to the other of said pair of tubular members and adapted to hold said other tubular member in contact with said weld-backing roll adjacent the point where said members abut; whereby friction between said members and said rolls impart rotation to said rolls whenever said members move between said rolls and whereby said pair of tubular members are members are maintained in abutting end contact in the same plane in at a portion of their circumferential area.

9. In a device as set forth in claim 8, wherein said first support means is disposed in a fixed axial position and said second support means is disposed in a position axially adjustable relative to the fixed position of the first support means; whereby said second support means may be moved axially away from said first support to permit the mounting of said tubular members and the accommodation of tubular members of varying lengths.

10. In a device as set forth in claim 8 wherein said first and second support means comprise expandable elements adapted to contact the interior of the tubular members to secure the tubular members in position on said support and to provide a uniform contour to said tubular members.

11. In a device as set forth in claim 8 wherein the first and second supporting means are rotatably driven at synchronized speeds, thereby moving said tubular members between said weld-backing roll and said hold-down rolls thus causing said rolls to rotate their axes.

12. In a device as set forth in claim 8 wherein said hold-down rolls are generally frusto-conical and said hold-down rolls are supported on intersecting axes in such a manner that a portion of the surface of said hold-down rolls is substantially parallel to an adjacent portion of the surface of said weld-backing roll.

13. In a device as set forth in claim 8 wherein the weld-backing roll comprises:
   (a) a first cylindrical portion having an internal cavity therein adapted to receive a supply of conditioning fluid under pressure, said portion having a supply port and an exhaust port operatively connecting said cavity to a fluid supply and exhaust line respectively, whereby said fluid is circulated through the cavity within said first portion thereby conditioning the same, and
   (b) a second cylindrical portion disposed in abutting relation with said first portion and operatively interconnected therewith so as to provide a composite substantially uniform roll surface, said second portion having an internal cavity adapted to receive a supply of conditioning fluid under pressure, said second portion having a supply port and an exhaust port operatively connecting said cavity to pressurized fluid supply and exhaust lines, respectively; whereby said fluid is circulated through the cavity within said second portion thereby conditioning said second portion.

14. In a device as set forth in claim 13 wherein the conditioning fluid is supplied to and exhausted from said cavity by supply and exhaust passages, respectively, within the supporting axle, said passages having openings communicating with the supply and exhaust ports within said cylindrical portions to circulate the conditioning fluid through said cavity.

References Cited by the Examiner

UNITED STATES PATENTS

| | | | |
|---|---|---|---|
| 2,091,307 | 8/1937 | Catlett et al. | 228—48 |
| 2,454,948 | 11/1948 | Seltzer | 219—66 |
| 2,613,303 | 10/1952 | Babbitt | 228—50 |
| 2,792,799 | 5/1957 | Dahlstrom | 228—50 |

WHITMORE A. WILTZ, *Primary Examiner.*

JOHN F. CAMPBELL, M. L. FAIGUS,
*Assistant Examiners.*